(12) United States Patent
Hsieh et al.

(10) Patent No.: US 12,458,585 B2
(45) Date of Patent: Nov. 4, 2025

(54) ANTIOXIDANT, ANTI-INFLAMMATORY, ANTI-UVB, ANTI-ALLERGIC, WHITENING, AND ANTI-WRINKLE ROSELLE SEED EXTRACT

(71) Applicant: WE-WIN BIO-MEDICAL CO., LTD., Kaohsiung (TW)

(72) Inventors: Hui-Ping Hsieh, Kaohsiung (TW); Chen Hsieh, Kaohsiung (TW); Fang-Rong Chang, Kaohsiung (TW); Chia-Hua Liang, Kaohsiung (TW); Yen-Chang Chen, Kaohsiung (TW); Yi-Hong Tsai, Kaohsiung (TW)

(73) Assignee: WE-WIN BIO-MEDICAL CO., LTD., Kaohsiung (TW)

( * ) Notice: Subject to any disclaimer, the term of this patent is extended or adjusted under 35 U.S.C. 154(b) by 455 days.

(21) Appl. No.: 17/972,106

(22) Filed: Oct. 24, 2022

(65) Prior Publication Data

US 2023/0131367 A1    Apr. 27, 2023

(30) Foreign Application Priority Data

Oct. 26, 2021   (TW) .................................. 110139685
Oct. 21, 2022   (TW) .................................. 111140141

(51) Int. Cl.
| | | |
|---|---|---|
| *A61K 36/00* | (2006.01) | |
| *A61K 8/36* | (2006.01) | |
| *A61K 8/9789* | (2017.01) | |
| *A61K 31/20* | (2006.01) | |
| *A61K 31/201* | (2006.01) | |
| *A61K 36/185* | (2006.01) | |
| *A61Q 17/04* | (2006.01) | |
| *A61Q 19/00* | (2006.01) | |
| *A61Q 19/02* | (2006.01) | |
| *A61Q 19/08* | (2006.01) | |

(52) U.S. Cl.
CPC ............ *A61K 8/9789* (2017.08); *A61K 8/361* (2013.01); *A61K 31/20* (2013.01); *A61K 31/201* (2013.01); *A61K 36/185* (2013.01); *A61Q 17/04* (2013.01); *A61Q 19/007* (2013.01); *A61Q 19/02* (2013.01); *A61Q 19/08* (2013.01); *A61K 2236/13* (2013.01); *A61K 2236/15* (2013.01); *A61K 2236/333* (2013.01); *A61K 2236/39* (2013.01); *A61K 2236/53* (2013.01)

(58) Field of Classification Search
CPC .................................................. A61K 2236/333
See application file for complete search history.

*Primary Examiner* — Qiuwen Mi
(74) *Attorney, Agent, or Firm* — Troutman Pepper Locke LLP; Tim Tingkang Xia, Esq.

(57) ABSTRACT

A use of extracts of roselle seeds for preparing a composition of antioxidant, anti-inflammation, anti-UVB, anti-allergy, whitening, moisturizing, and anti-wrinkle, wherein the extracts of the roselle seeds comprise lauric, palmitic, linoleic, oleic, or stearic acids; and a method for preparing the extracts of the roselle seeds comprises steps of: steeping of: extracting a weight ratio of the 12:1 to 20:1 roselle seeds and an ethanol solution with a concentration of 75 to 95%; and steeping the roselle seeds in the ethanol solution to obtain a suspension; and extraction of: the suspension being engaged in an extraction of a continuous and rapid oscillation with an ultrasonic energy with a total energy of 200 to 500W, wherein 1 to 3 hours of the oscillation is one cycle, and a total number of 3 to 5 cycles is lasted, in order to obtain roselle seed crude extracts.

10 Claims, 18 Drawing Sheets composition containing roselle seed oil product appearance on the first day product appearance after cooling and heating cycle

ANTIOXIDANT, ANTI-INFLAMMATORY, ANTI-UVB, ANTI-ALLERGIC, WHITENING, AND ANTI-WRINKLE ROSELLE SEED EXTRACT

BACKGROUND OF THE INVENTION

1. Field of the Invention

The present invention generally relates to a plant extract, more particularly to an extract from roselle seeds, and the extract can be used as raw materials for medicines, skin care, cosmetics, fragrances, body cleaning, etc.

2. Description of the Prior Art

*Hibiscus sabdariffa* is a plant of the Malvaceae family, and its stem branches are mostly reddish-purple. The leaves are long-stalked and alternate, of which the young leaves are single, and split into three or five leaves when they are mature. The flower axillaries are solitary, and the mature calyx petals are thick with purple-red color. The colors of the flower and flower center are light red and purple black, respectively. The fruit is in sac-shape, and its interior is divided into five chambers, each of which contains 5 to 8 seeds.

In prior arts, the research on roselle mostly focused on the water or ethanol extract of the "flower" of Roselle, wherein most of the extracted active ingredients are classified as hydroxycitric acid, hibiscus acids, flavonoids, anthocyanins, protocatechuic acid, or polysaccharides. Researches focused to the "seeds" extract of roselle is limited. Its potential has not been fully exploited. Investigation on ingredients and bioactivities of roselle seeds is important, so that it can be utilized more widely to enhance its economic value.

SUMMARY OF THE INVENTION

The main purpose of the present invention provides the active ingredients extracted from the roselle seeds, and the active ingredients are made to be products that are beneficial and protective to the skin of human beings.

To achieve aforesaid objective, the present invention provides a use of extracts from roselle seeds for preparing a composition of antioxidant, anti-inflammation, anti-UVB, anti-allergy, whitening, moisturizing, and anti-wrinkle, wherein the extracts of the roselle seeds comprise lauric, palmitic, linoleic, oleic, and stearic acids; and a method for preparing the extracts of the roselle seeds comprises steps of: 1.) steeping: extracting a weight ratio of roselle seeds in ethanol solutions with the concentrations of 75 to 95% between 12:1 to 20:1; steeping the roselle seeds to obtain a suspension in the ethanol solution; and 2.) extraction: the suspension being engaged in an extraction of a continuous and rapid oscillation with an ultrasonic energy with a total energy of 200 to 500 W, wherein 1 to 3 hours of the oscillation is one cycle, and a total number of 3 to 5 cycles is lasted, in order to obtain roselle seed crude extracts.

Preferably, the method for preparing the extracts of the roselle seeds further comprises a step of: 3.) filtering and concentrating being that of: removing a solvent of the roselle seed crude extracts in order to obtain the roselle seed extracts, wherein the roselle seed extract is roselle seed oil.

Preferably, the method for preparing the extracts of the roselle seeds further comprises a step of: 4.) cleaning being that of: purifying the roselle seeds with water, before the step of steeping.

Preferably, the method for preparing the extracts of the roselle seeds further comprises a step of: 5.) shredding being that of: shredding the roselle seeds or griding the roselle seeds to particles until a diameter of a particle being not greater than 1 mm, before the step of steeping.

Preferably, the combination is applied to skin of human beings so as to improve skin tone, reduce skin erythema index, improve skin moisturization, tighten skin pores, reduce skin texture, and reduce skin inflammation.

Preferably, a dosage of the composition is 1 to 10 mg per square centimeter of the skin.

Preferably, the extracts of the roselle seeds comprise a relative ratio of 8% to 10% of lauric acid, 44% to 52% of palmitic acid, 16% to 24% of linoleic acid, 15% to 23% of oleic acid, and 1% to 4% of stearic acid.

Preferably, the step of cleaning is to purify the roselle seeds, i.e., 5 to 15 minutes as one cycle, and repeats for 2 to 6 cycles.

Preferably, the method for preparing the extracts of the roselle seeds further comprises a step of: 6.) drying being that of: disposing the roselle seeds on an absorbing material for drying 12 to 72 hours, after the step of cleaning.

Preferably, a production rate of the roselle seeds is between 4% and 10%.

Compared with prior arts, the present invention has the advantages that are described below. There is no systemic investigation focused on the extracted roselle seed oil and its bioactive value. Roselle seed extract in the present invention is extracted and obtained to have the utilization in the benefits to the skin of human beings, and of the extracts are manufactured as spray products, so as to let users evenly spray or coat the products on the skin of human beings, and thus the human skin can evenly absorb the active ingredients contained in the roselle seed extract. As a matter of fact, skin disorders like itching, redness and roughness would easily happen after a long-term mask wearing in daily life. External environment, high temperature, ultraviolet radiation, or air pollution will also cause significantly increases of skin sensitive problems. Therefore, those factors which accelerate the deterioration of skin diseases, skin aging, or the formation of pigment spots would led to the occurrences of skin sensitivity. The active ingredients contained in the roselle seed extract revealed in the present invention would exhibit bioactive capacities on human skin as anti-oxidation, anti-inflammation, anti-UVB, anti-allergy, whitening, moisturizing and anti-wrinkle. It can be used as botanical active pharmaceutical ingredient (API) for being formulated as medicines, skin care products, cosmetics, fragrances, body cleaning, etc. In addition, the roselle seed extract is harmless to skin cells and human body, and can be used without concerns.

Other and further features, advantages, and benefits of the invention will become apparent in the following description taken in conjunction with the following drawings. It is to be understood that the foregoing general description and following detailed description are exemplary and explanatory but are not to be restrictive of the invention. The accompanying drawings are incorporated in and constitute a part of this application and, together with the description, serve to explain the principles of the invention in general terms. Like numerals refer to like parts throughout the disclosure.

BRIEF DESCRIPTION OF THE DRAWINGS

The Objects, Spirits, and Advantages of the Preferred Embodiments of the Present Invention Will be Readily Understood by the Accompanying Drawings and Detailed Descriptions, Wherein.

DETAILED DESCRIPTION OF THE INVENTION

Following preferred embodiments and figures will be described in detail so as to achieve aforesaid objects.

The present invention provides a use of extracts of roselle seeds, and prepares a composition of antioxidant, anti-inflammation, anti-UVB, anti-allergy, whitening, moisturizing, or anti-wrinkle. As shown in FIG. 1, the extract of the roselle seed has lauric, palmitic, linoleic, oleic, or stearic acids.

Further, a method for preparing the extracts of the roselle seeds comprises steps of:

(1) a steeping being that of extracting a weight ratio of roselle seeds between 12:1 to 20:1 in ethanol solutions with the concentrations of 75 to 95%, and steeping the roselle seeds in the ethanol solution to obtain a suspension; and (2) an extraction being that of the suspension being engaged in an extraction of a continuous and rapid oscillation with an ultrasonic energy with a total energy of 200 to 500 W, wherein 1 to 3 hours of the oscillation is one cycle, and a total number of 3 to 5 cycles is lasted, in order to obtain roselle seed crude extracts. Regarding to a preferred embodiment, the extract of the roselle seed comprises a relative ratio of 8% to 10% of lauric acid, 44% to 52% of palmitic acid, 16% to 24% of linoleic acid, 15% to 23% of oleic acid, and 1% to 4% of stearic acid. For further preferred embodiment, the extracts of the roselle seeds comprise lauric, palmitic, linoleic, oleic, and stearic acids. For more preferred embodiment, the composition further comprises additional components, which were selected from the group consisting of follows: purified water, 1,2-hexanediol, natural moisturizing factor (Sodium PCA), glycerin (Glycerin), preservative (Chlorphenesin), Allantoin (Allantoin), fragrance (fragrance), or a combination thereof, but not limited thereto. In addition, in one more preferred embodiment, the composition is adapted to be made as a spray product, and can evenly be coated or sprayed on the skin of a human being. For two more preferred embodiment, the dosage of the composition is of 1 to 10 mg, 2 to 8 mg, 3 to 6 mg, or 4 to 5 mg per square centimeter of human skin, with no actual limitations. Another preferred embodiment, the weight ratio of the roselle seeds to the ethanol solutions are 1:12, 1:13, 1:14, 1:15, 1:16, 1:17, 1:18, 1:19, or 1:20, but without any limitation. In addition, the concentration based on volume percent of the ethanol solution is 90% as well, but with no limitations. In step (2), 24-hour of the oscillation is one cycle, and a total number of 3 cycles is lasted, but not limited thereto.

Figure 1A:
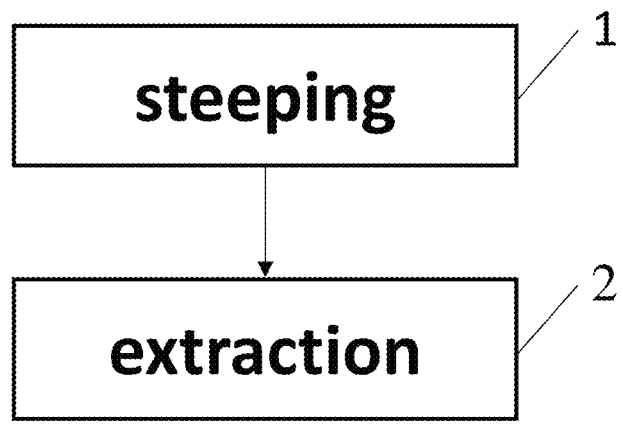
FIG. 1A to FIG. 1E illustrates a series of block flow charts, which demonstrates a manufacturing process for roselle seed extracts.
Figure 1B:
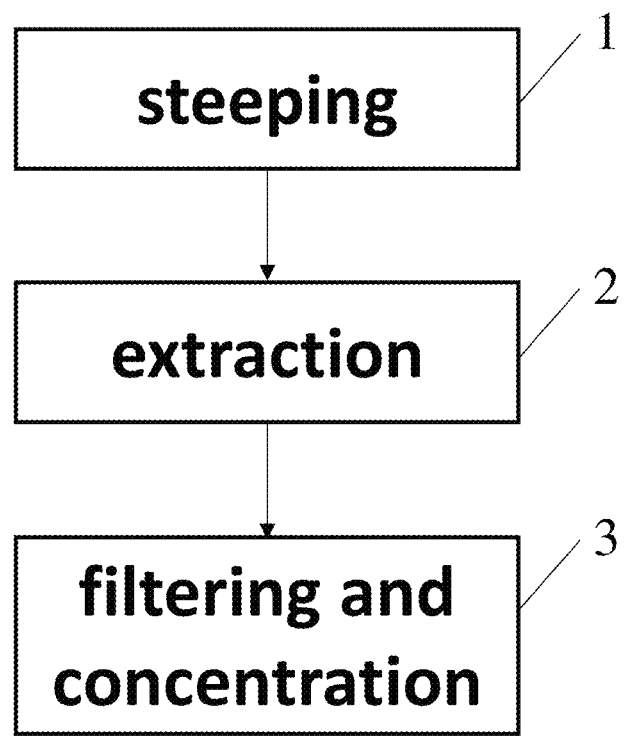
Figure 1C:
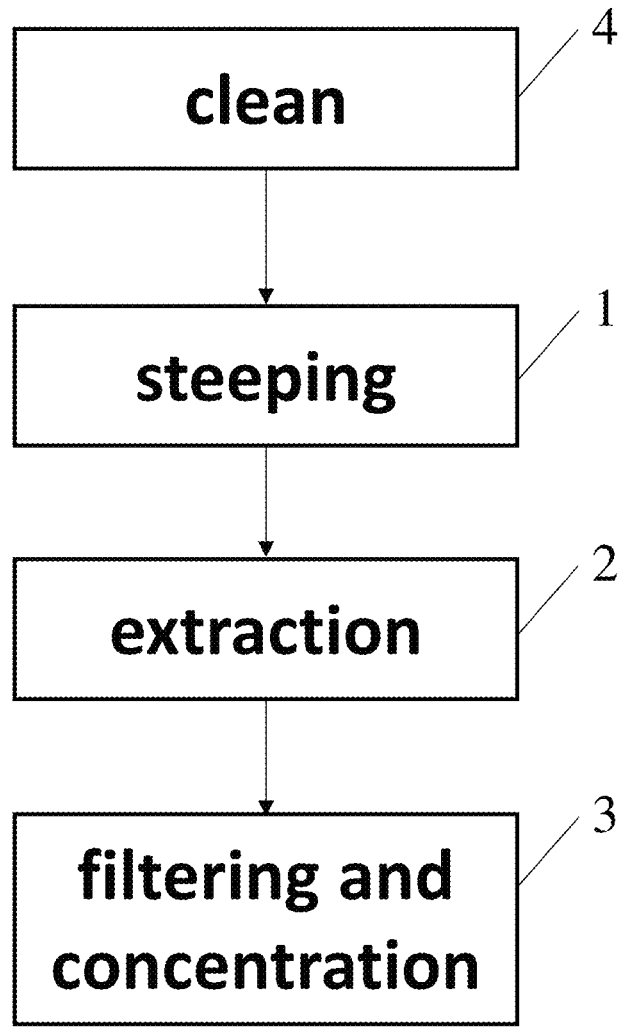
Figure 1D:
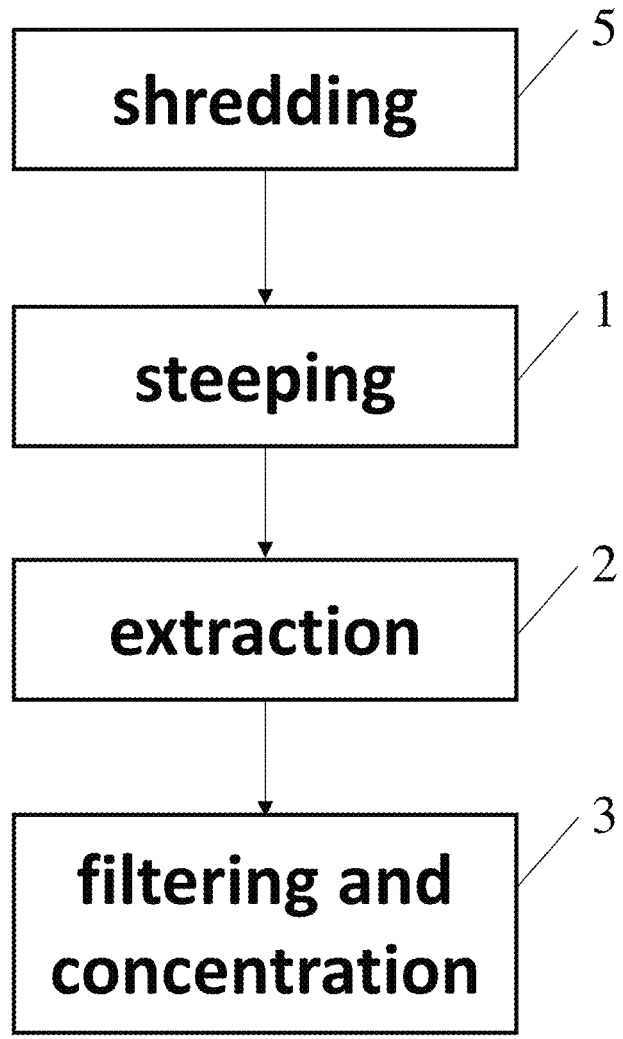

Preferably, as shown in FIG. 1B, in order to remove the solid matter, residue and solvent contained in the roselle seed crude extract to obtain roselle seed oil, the method for preparing the extracts from the roselle seeds further comprises a step of:

(3) a filtering and concentration being that of removing a solvent of the roselle seed crude extracts in order to obtain the roselle seeds extracts, wherein the roselle seed extract is roselle seed oil. FIG. 1C shown as another preferred embodiment, which is to remove the dirt or adhesion on the surface of roselle seeds, so as to avoid the deterioration of the active ingredients of the extract and further comprises a step of:

(4) a clean being that of purifying the roselle seeds with water, before the step of steeping. FIG. 1D is another embodiment, which is to increase the contact area between roselle seeds and ethanol solution for improving the extraction efficiency and comprises a step of:

(5) a shredding being that of shredding the roselle seeds or griding the roselle seeds to particles until a diameter of a particle being not greater than 1 mm, before the step (1) of steeping. For more preferred embodiment, as shown in a further step of:

(4) a clean being that of washing the roselle seeds with reverse osmosis flowing water, wherein 5 to 15 minutes of the washing is one cycle, and a total number of 2 to 6 cycles is lasted.

Figure 1E:
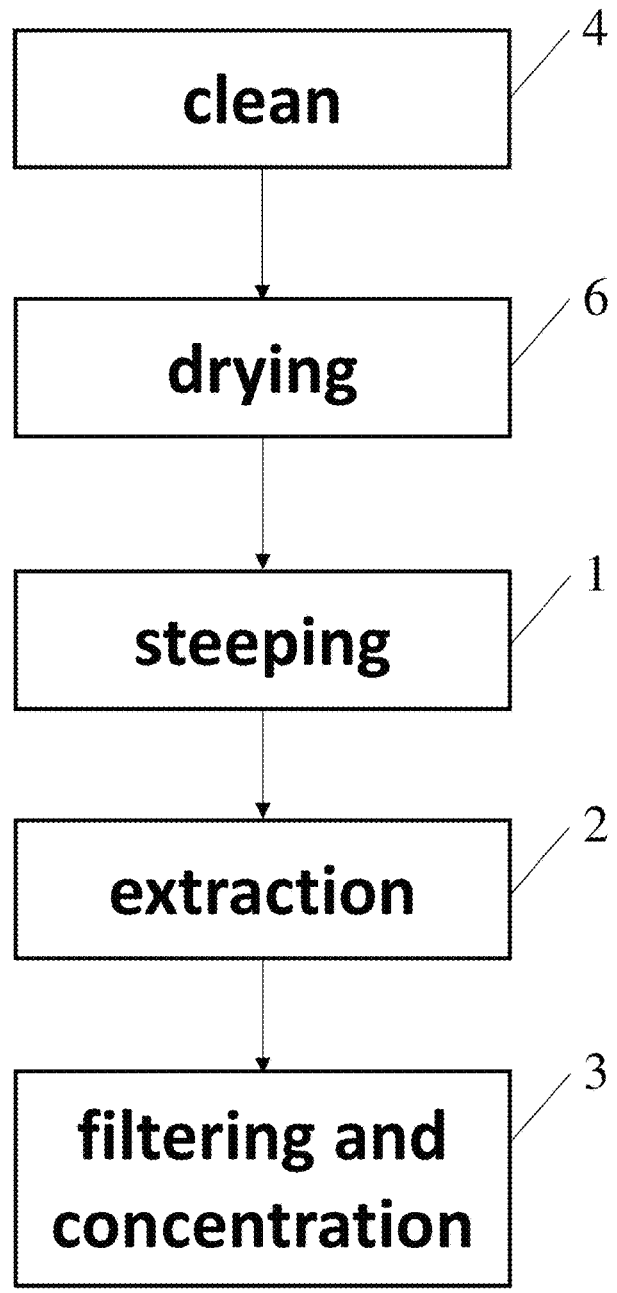

Preferably, 10-min washing is one cycle, and a 3-time-cycle is preferred, but without limitations. Additionally, in order to remove the water on the surface of roselle seeds, as well as the water contained thereof, so as not to affect the purity of the solvent, a step (6) of drying is a must. As shown in FIG. 1E, the seeds are disposed on a water-absorbent material and dried in the shade for 12 to 72 hours, after cyclic cleaning of the roselle seeds, or 36 to 48 hours, but with no limitation. In practice, the seeds shall be dried under a room temperature, but this is not only an option. For one more preferred embodiment, in the step (5) of shredding, a grinder is used to grind the roselle seeds for 5-30 minutes. In order to ensure that the roselle seeds will not be overheated in the machine to cause the change of contained chemical compositions which are responsible for bioactivities, the grinding time is less than 25 minutes; more preferably, no more than 20 minutes will be better. For two more preferred embodiment, the average yield of the roselle seed oil is 4 to 10%, preferably, 5 to 8%, and more preferably, 6.72%, but without limitations hereto.

Following will be in related to the experiments of physical property determination, active ingredient determination of the roselle seed oil, and the relevant experiments of which is applied to the skin of human beings in order to verify its efficacy. The roselle seed extract described below is kind of a roselle seed oil; or simply roselle oil.

Figure 2:
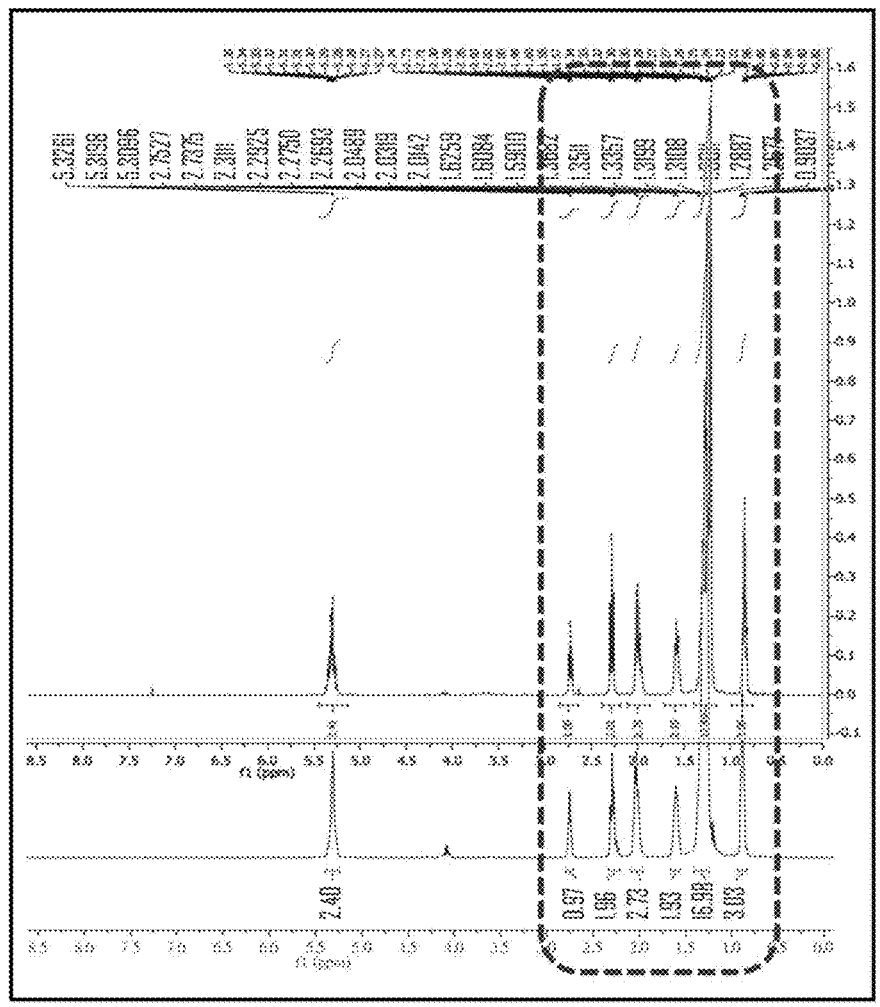
FIG. 2 to FIG. 14 illustrate a series of tested results, which demonstrates the effects of using roselle seed extracts.

As shown in table 1, which is to store the roselle seed oil under 4° C. and without light exposures for one month, and then illustrates the changes of its physical properties. Those include an odor test, to observe the change of the odor of roselle seed oil; a color test, to measure with a color difference meter for observing the color change of the roselle seed oil; and a pH test, to measure the variety of the pH value of the roselle seed oil. As it can be seen, after storing the roselle seed oil for one month, the odor was nothing changed, the color did not obviously change after comparison by colorimeter, and the pH value remained stable. With reference to FIG. 2, which illustrated the results of an evaluation by proton nuclear magnetic resonance ($^1$H NMR). In the comparison of $^1$H NMR spectra between the first-day and after-one-month storages, both of them presented characteristic signals of special fatty acids and triglycerides (marked by the red dotted line). There was no obvious change in the ratio of the ingredients, and the two $^1$H NMR spectra showed stable and consistent patterns. As a conclusion, the conditions of being placed under 4° C. without light exposures are preferred ways to store the roselle seed oil. Another preferred embodiments are that the solvent for $^1$H NMR is CDCl$_3$ and the NMR frequency is 400 Mhz, but not limited thereto.

TABLE 1

Changes in Physical Properties of Roselle Seed Oil

| | Odor | Color | pH Value |
|---|---|---|---|
| First Day | No Change | 61.7 | 6.35 |
| One Month Later | | 62.1 | 6.41 |

Figure 3:
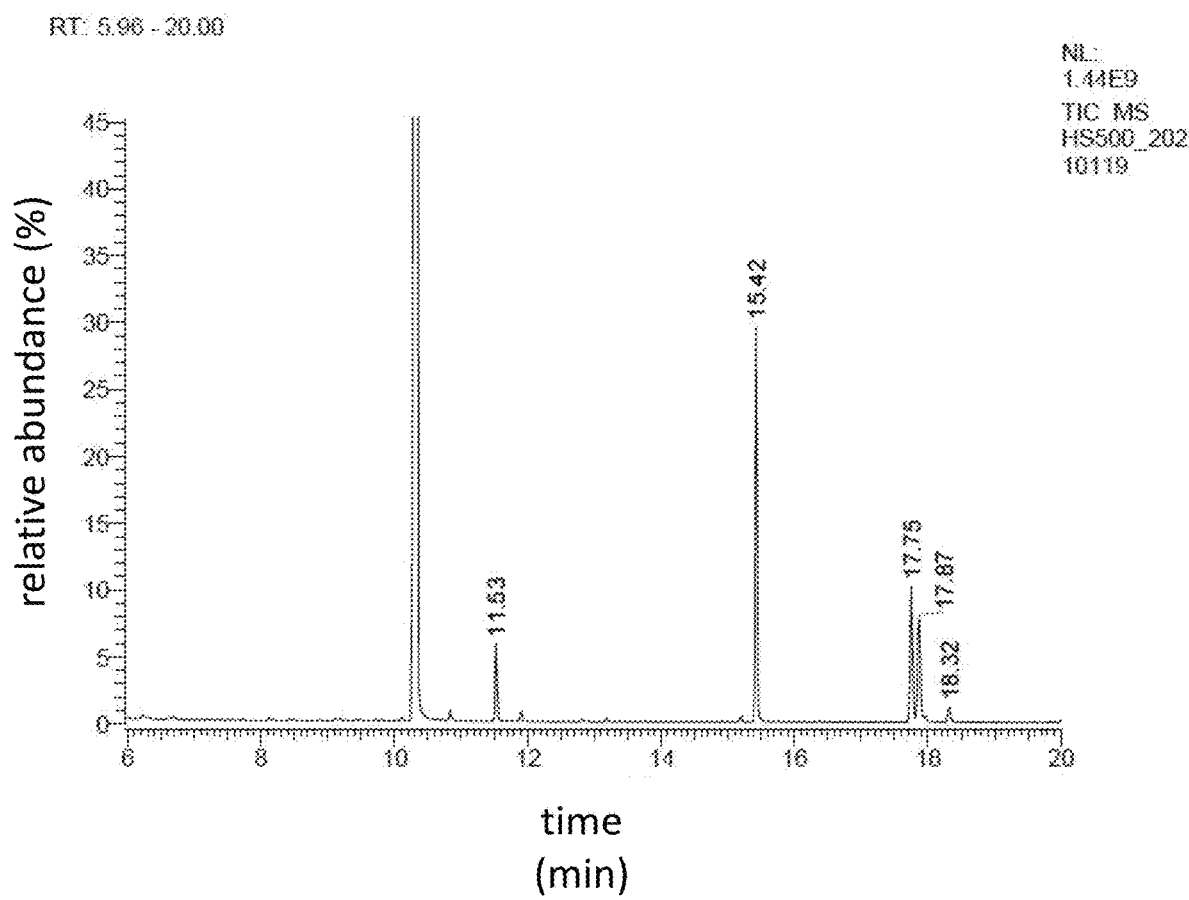

Regarding to FIG. 3, which illustrates a gas chromatography tandem mass spectrometry (GC-MS) fingerprint of roselle seed oil. Fatty acid compositions are the main ingredients for the property of the roselle seed oil, the GC-MS spectrometry was used for establishing optimal quality control parameters and fingerprints. After several experiments and improved conditions, the parameters of quality control had been obtained and detailed as follows: Gradient analysis was performed using a GC-MS, DSQ II Single Quadrupole GC/MS, in series with a 30 m long×0.25 mm diameter×0.25 micron film thickness DB-5MS column (Agilent J&W Scientific). In practice, the instrument setting conditions were as follows: 240° C. of a detector temperature, 240° C. of an injection port temperature (constant temperature split mode), 70 eV of an electron impact energy, 1.0 mL/min of a gas flow rate, helium of a delivery gas, 5 microliter of an injection volume, 50 mL/min of a split flow rate, 50 of a split ratio, 59 to 850 atomic mass units (amu) of a mass range, and 240° C. of a chromatography mass spectrometer interface temperature, and electron ionization of positively charged ions of a mass spectrometry. The oven heating program was set as follows: 120° C. for 5 minutes, 120° C. to 220° C. for 10 minutes at 10° C./min, and a final constant temperature of 220° C. for 5 minutes, and remaining 20 minutes to the end. The structures of the compounds were identified by comparison to related standards purchased from Sigma-Aldrich®. The relative percentage of each major component in the roselle seed oil was quantified based on the peak area integrated by Thermo Xcalibur™ data analysis program (Thermo fisher Scientific, USA), wherein five ingredients were identified and listed as below: lauric acid (9.61%), palmitic acid (48.39%), linoleic acid (20.12%), oleic acid (19.13%) and stearic acid (2.76%).

TABLE 2

Main Ingredients of Roselle Seed Oil

| Compound Names | Molecular Weight (amu) | Molecular Formula | Retention Time (min) | Ratio to total Ingredients (%) |
|---|---|---|---|---|
| Laurie acid | 200.32 | $C_{12}H_{24}O_2$ | 11.53 | 9.61 |
| Palmitic acid | 256.40 | $C_{16}H_{32}O_2$ | 15.42 | 48.39 |
| Linoleic acid | 280.44 | $C_{18}H_{32}O_2$ | 17.75 | 20.12 |
| Oleic acid | 282.47 | $C_{18}H_{34}O_2$ | 17.87 | 19.13 |
| Stearic acid | 284.48 | $C_{18}H_{36}O_2$ | 18.32 | 2.76 |

Figure 4:
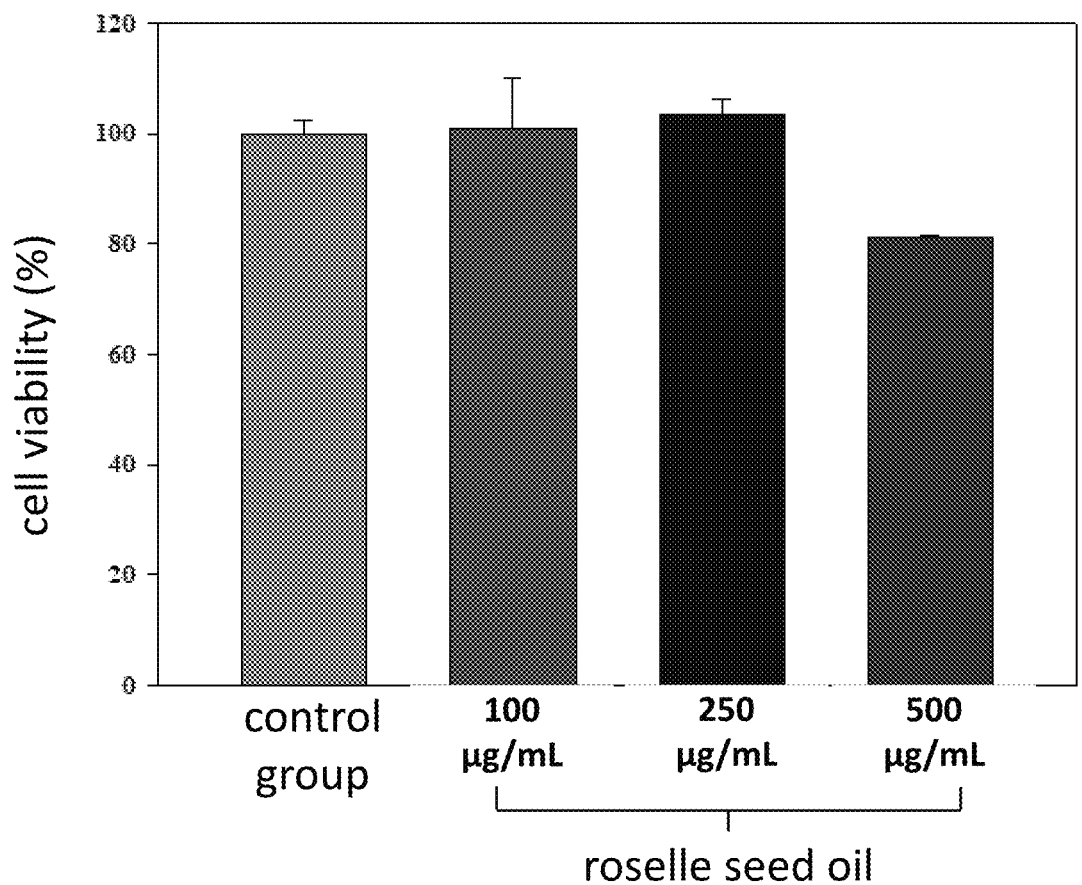

In regard to FIG. 4, which is a test result of the cell viability. The first contact tissue of skin care or conditioning product is on the epidermis of the skin. Since the epidermis of a human being is mainly composed of keratinocytes, human skin keratinocytes are utilized to evaluate the safety (cell viability). The experiment adopts the MTT assay test to estimate whether the roselle seed oil is cytotoxic to skin cells. As a matter of fact, human skin keratinized HaCaT cells (1×10$^4$/well) were cultivated in 96-well plates and incubated at 37° C. in a 5% CO$_2$ incubator for at least 24 hours. At the time point set for observing the response of the added roselle seed oil, original media in the 96-well plate was removed. Cells were washed with PBS once and re-incubated with fresh media. Then, 10 of MTT (3-(4,5-cimethylthiazol-2-yl)-2,5-diphenyl tetrazolium bromide) solution was added and co-incubate for 4 hours at 37° C., 5% CO$_2$. Then, removed the Media and added 100 of DMSO to dissolve the formazan precipitate. At last, absorbance was measured at the wavelength of 570 nm (BioTek, Synergy™, USA). For the evaluation, the doses of roselle seed oil were designed as 100, 250, and 500 µg/mL to interact with cortical keratinocytes. The result was found as following: After treating with roselle seed oil for 24 hours, the cell viabilities of cortical keratinocytes under the doses of 100 and 250 µg/mL were quite close to each other. The cell viability of 500 µg/mL loading group was 81.21%. The outcomes indicated that the safety concentration of the roselle seed oil to keratinocytes is lower than 500 µg/mL. The loading dose to maintain the skin cell viability higher than 90% should be no more than 250 µg/mL.

Figure 5:
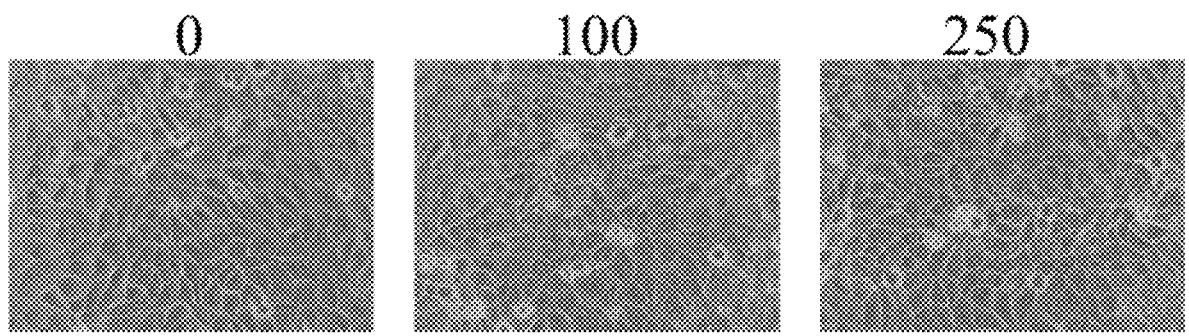

In regarding to FIG. 5, the microscopic photos illustrate the morphological changes of skin cells treated with roselle seed oil. Specifically, the human skin keratinocytes (1×10$^4$/well) were cultivated in 96-well plates, and incubated in a 5% CO$_2$ incubator at 37° C. for at least 24 hours. Then, the roselle seed oil was then added, and interacted with keratinocytes for a specified period. After that, the cell morphology were observed, photographed and recorded through microscope (Nikon, TE2000-U, Japan). According to the results, the morphologies of cortical keratinocytes treated with 100 and 250 µg/mL for 24 hours exhibited no significant difference with the untreated ones. It indicated that the roselle seed oil did not affect the cell morphology. Below 250 µg/mL of roselle seed oil, the proportion of skin cell morphological changes was less than 10%.

For further ensuring that of the safety and health concern to users, the roselle seed oil was monitored with pesticide residue tests. Samples of roselle seed oil were sent to a third-party notary, SUPER LABORATORY CO., LTD., for engaging in 373 pesticide tests. According to the final report, none of the 373 pesticides had been detected. The roselle seed oil in the current invention did not be polluted with pesticides.

Figure 6:
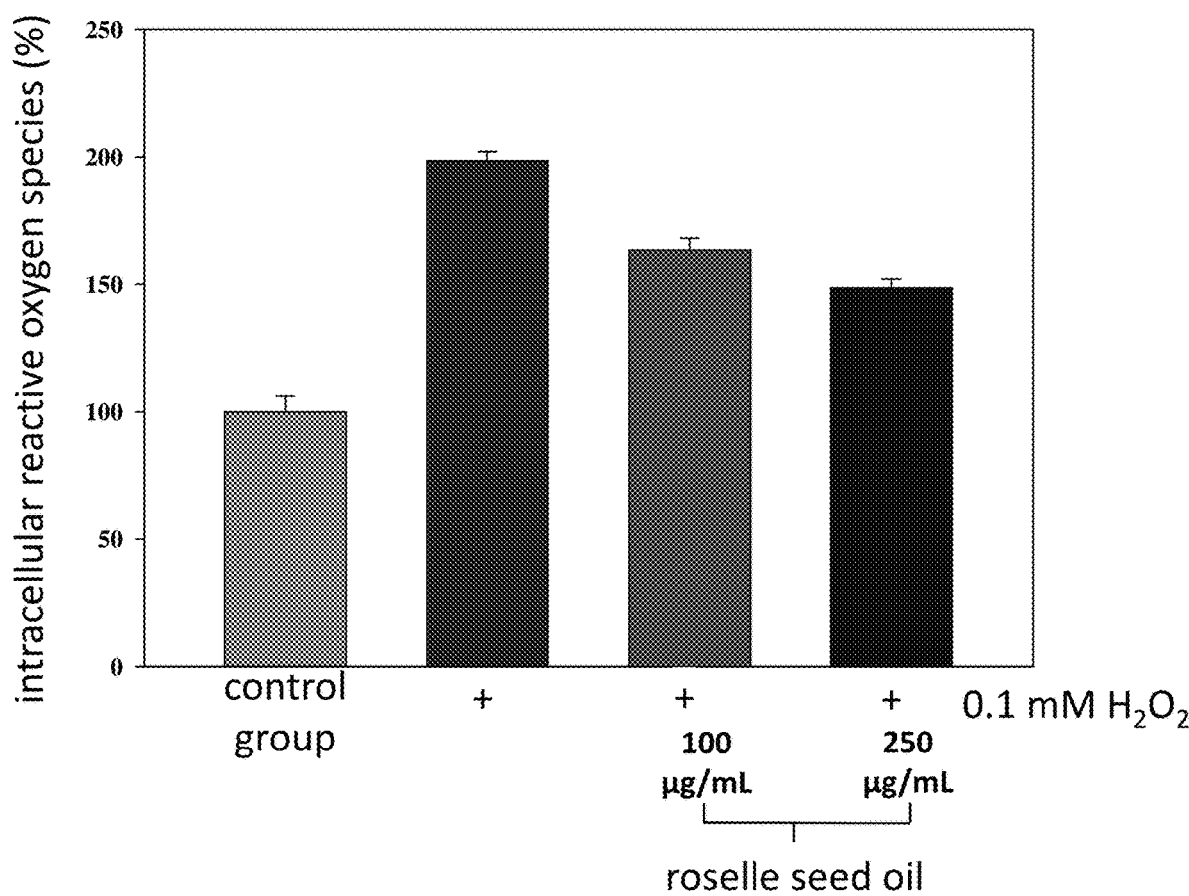

In relation to FIG. 6, which illustrates test results of a total antioxidant capacity of the roselle seed oil, wherein the test was assessed by the test of trolox equivalent antioxidant capacity (TEAC). According to the relationship between the absorbance value and the concentration of trolox, the regression equation of the standard curve was created. Trolox was used as the positive control group, 0.25 mL peroxidase (4.4 U/mL), 0.25 mL 2,2-azino-bis [3-ethyl-benzthiazoline-6-sulfonic acid] (ABTS, 100 µM), 0.25 mL H$_2$O$_2$ (50 µM) were mixed with 1.5 mL deionized water evenly. After 10 minutes of reaction, stable blue-green cationic radicals were generated. 0.1 mL of the roselle seed oil sample or standard (trolox) was mixed with 0.9 mL of TEAC reagent. After reacting at room temperature for 10 minutes, the absorbance was measured at 734 nm by spectrophotometer. According to the relationship between the absorbance and the concentration of trolox, the regression equation of the standard curve was acquired. The absorbance values of the samples were obtained by converse with the equivalence of the TEACH values. The final test result was that the absorbance value could not be measured, because roselle seed oil and the reagent were reacting and generated turbidity. According to FIG. 6, the oxidative stress assay reagent, CellROX® (C10444, ThermoFisher), was thus used to determine the antioxidative capacity of the roselle seed oil. CellROX® is a novel fluorescent probe for measuring oxidative stress in living cells. Since cells are oxidized by reactive oxygen species, the probe will bind to DNA and emit a stable and bright green fluorescence. After the cells were exposed to the doses of 100, 250 and 500 µg/mL roselle seed oil for 24 hours, the supernatant was removed. The culture medium containing 0.1 mM $H_2O_2$ was then added to induce oxidative stress for 1 hour. After the induction, the $H_2O_2$-added supernatant was removed, and further added the quantitated PBS to measure the fluorescent value at 485/520 nm by immunofluorescence analyzer. The results showed that the intracellular oxidative stress increased significantly up to 198.6% after the cells were exposed to $H_2O_2$. In contrast, the intracellular oxidative stress decreased down to 163.3% after adding the 100 µg/mL roselle seed oil. Further, the intracellular oxidative stress was down regulated to 148.6% after the administration of 250 µg/mL roselle seed oil. It means the roselle seed oil is able to decrease the intracellular oxidative stress to 50.0%.

Figure 7:
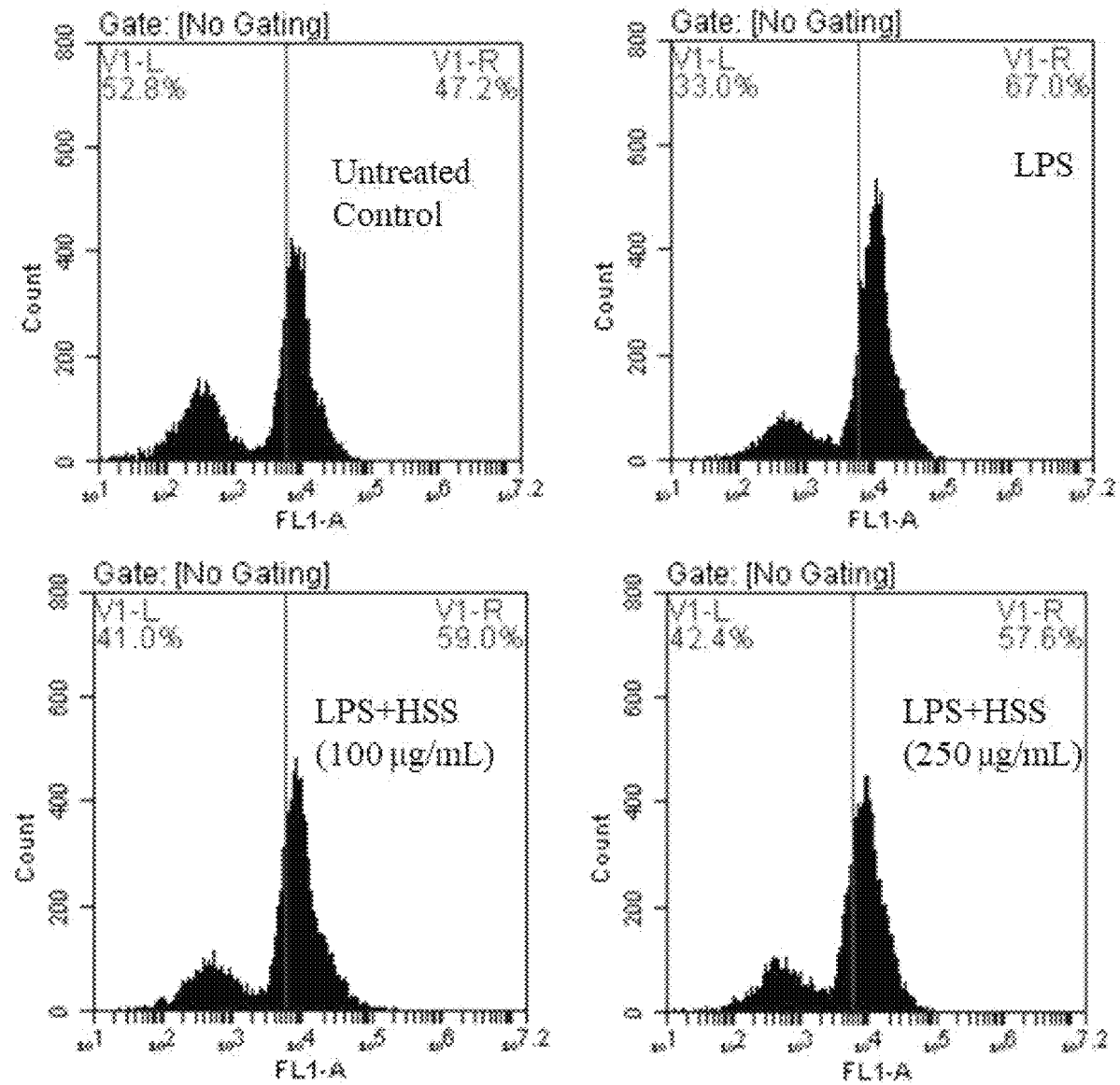

As shown in FIG. 7, it illustrates the results of an anti-inflammatory potential of the roselle seed oil. It is known that nitric oxide is a mediator of inflammatory response and induces many inflammatory factors. The nitric oxide free radical scavenging test is used to evaluate whether the roselle seed oil has an anti-inflammatory effect. Rutin was used as a reference compound as positive control. 98 sodium nitroprusside (5 mM) was added with 2 roselle seed oil to incubated at 25° C. for 150 minutes. 100 Griess Reagent (0.1% naphthylenediamine dihydrochloride, 5% phosphoric acid, and 1% sulfanilamine) was then added, and the absorbance is measured at 560 nm (BioTek, Synergy™, USA). The final test result was that the absorbance value could not be measured. Hence, as shown in FIG. 7, based on the specificity of the immunizing antibody of antigen binding, the intracellular composition is analyzed with fluorescent staining. Understandably, nitric oxide (NO) is a mediator of inflammatory responses, and NO in the human body is regulated by inducible nitric oxide synthase (iNOS), so the experiment will determine whether the roselle seed oil affects the expression of the intracellular iNOS. Cells were firstly treated with 1 µg/mL lipopolysaccharide (LPS) for 30 minutes, then the roselle seed oil was co-incubated for 24 hours. After adding the iNOS antibody with fluorescent label, cells responses were analyzed with a flow cytometer. The results demonstrated that the iNOS fluorescence value from the cells is 67.0% after LPS induction. After adding 100 µg/mL of the roselle seed oil, the intracellular iNOS expression was decreased down to 59.0%. After adding 250 µg/mL mL of the roselle seed oil, the expression of the intracellular iNOS was lowering down to 57.6%, which means that roselle seed oil could reduce the expression of the intracellular iNOS by 9.4%. Accordingly, as it can be seen obviously, the roselle seed oil is able to reduce the expression of iNOS, thereby inhibiting the production of NO.

Figure 8:
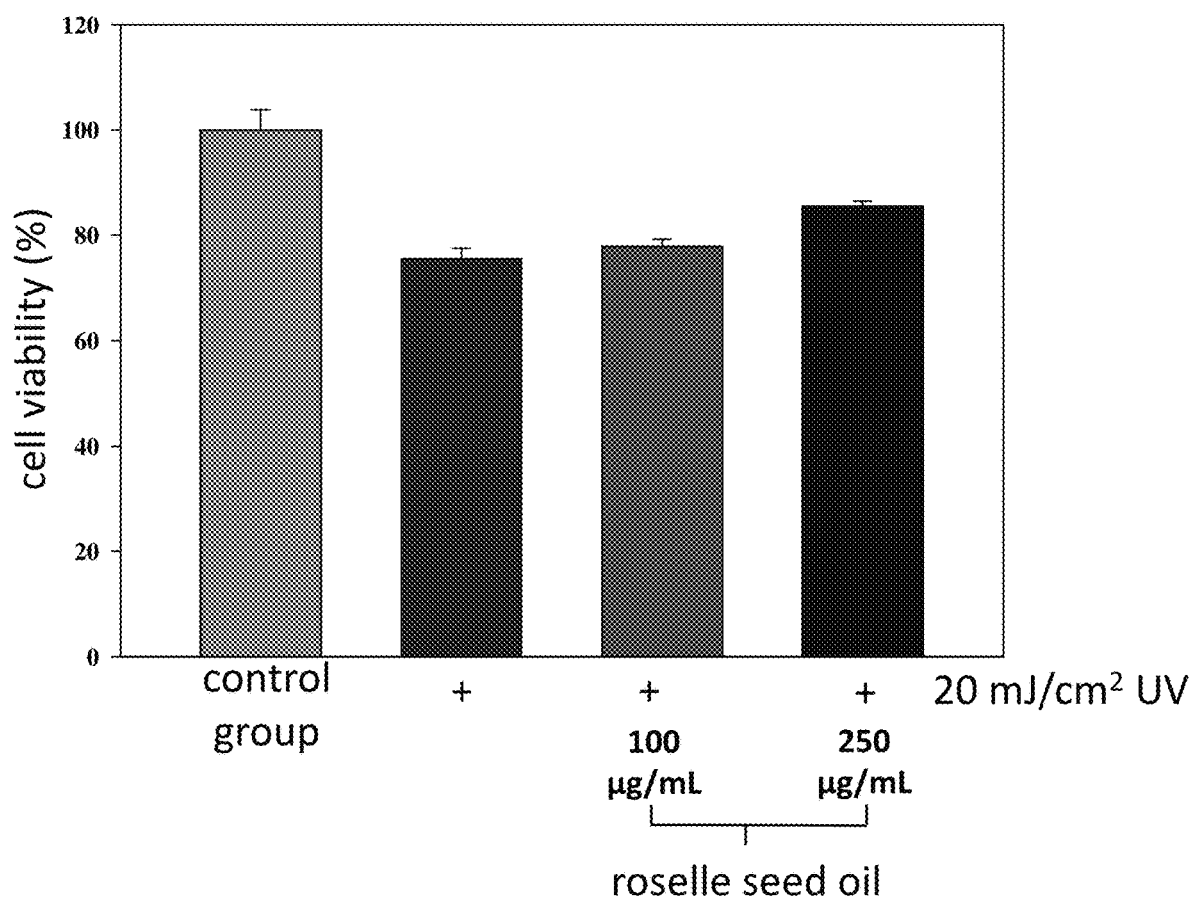

With regard to FIG. 8, it is the tested result of the protection efficacy of the roselle seed oil against the Ultraviolet (UV) radiation and the free radical damage. It is an evaluation to confirm whether roselle seed oil can protect circular DNA. The pUC119 DNA plasmid is a circular structure (S-form) of DNA. After UV exposure or oxidative damage, the supercoiled structure will be opened into a linear structure (L-form). First, the circular DNA and the roselle seed oil were mixed, and then reacted under UV exposure and oxidizing agents. The electrophoresis film image capture system continuously analyzed the percentages of S-form DNA and L-form DNA, in order to observe the damaged situation of DNA. Therefore, the protective efficacy of the roselle seed oil against UV and oxidative damage were evaluated. The test results are described below. The situation of DNA damage cannot be observed by electrophoresis after the reaction of roselle seed oil and the reagents. Therefore, the cell viability tests were conducted with UV irradiation on the cells treated with roselle seed oil. The roselle seed oil was added with HaCaT cells for 4 hours, and then irradiated with 20 mJ/cm$^2$ UVB. The cell viability was measured by MTT. After UVB irradiation, the cell viability was 75.6%, and after adding 100 µg/mL roselle seed oil, the cell viability went up to 77.9%. After adding 250 µg/mL roselle seed oil, the cell viability raised up to 85.5%. Therefore, the conclusion is that roselle seed oil can effectively protect cells from UVB damage.

Figure 9:
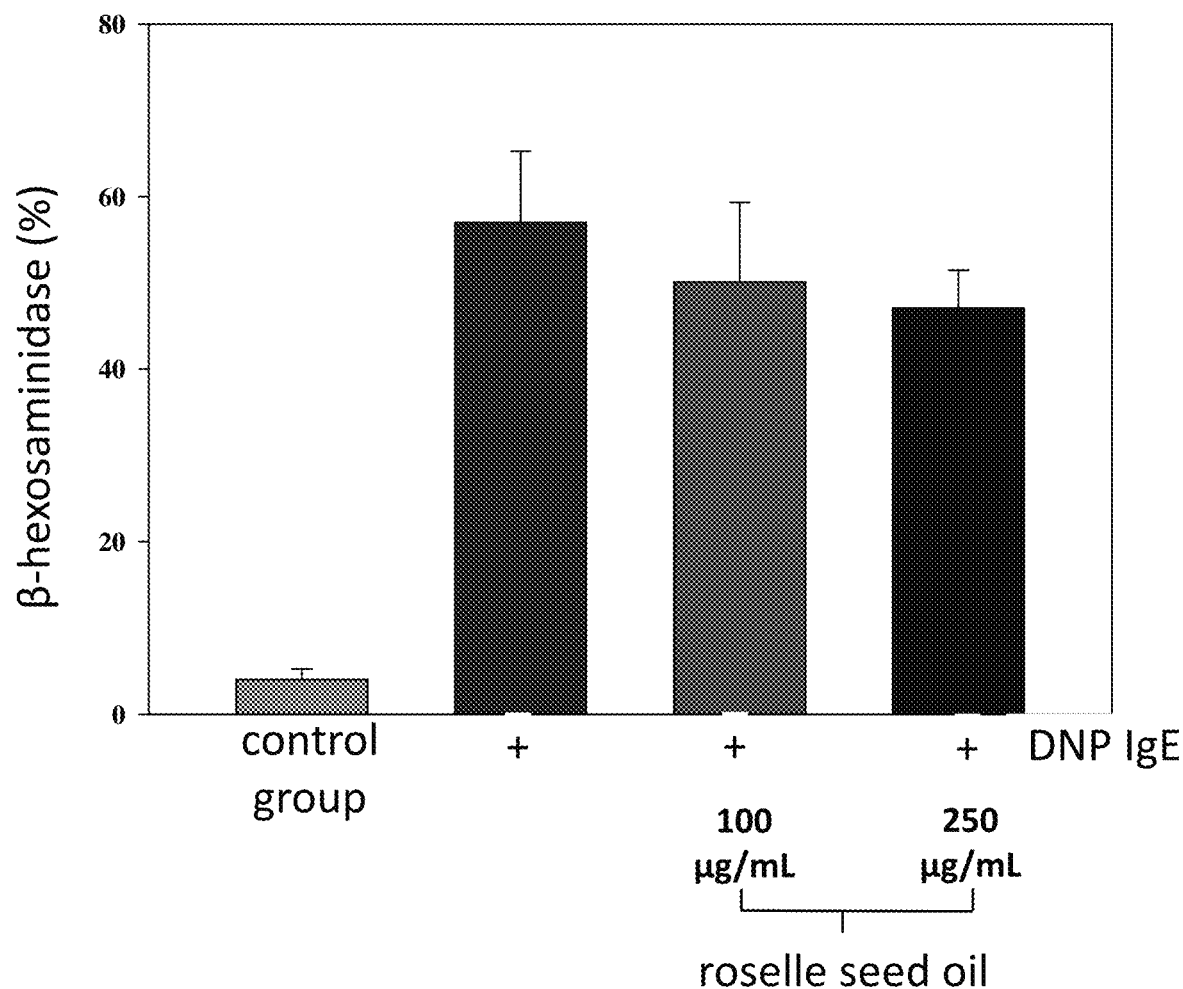

As shown in FIG. 9, it illustrates a test result of the anti-allergic activity of the roselle seed oil. Allergy is an abnormal response of creatures after contacting allergens. People with allergic constitutions are sensitive to allergens and would easily be induced systemic allergy, even anaphylaxis. Some chemical substances, ultraviolet radiation, pollen and dust are generally regarded allergens. Allergic mediators play a direct role in the occurrence of allergic reactions. Allergens are the external causes of allergic diseases, while low immunity as well as oxidative destruction regarding to large number of free radicals generated by mast cells and basophils are internal factors. There are two types of immuno cells, mast cells and basophils, widely distributed in the human body, i.e., nasal, bronchial and gastrointestinal mucosa, along with peripheral microvascular and visceral organs in the connective tissue under the skin. They would secrete allergic mediators, such as histamine, leukotrienes, serotonin, and kinins. In the experiment of evaluating anti-allergic activity, mast cell lines are adopted to test with roselle seed oil. Stimulated by IgE antibody or calcium ionophore, mast cells would release a large amount of β-hexosaminidase enzyme through degranulation. The amount of β-hexosaminidase release can be measured to determine whether the test sample has the potential to inhibit allergic reactions. First, mast cells were cultivated with 10% FBS/DMEM of in a 96-well plate and pre-treated with 0.5% roselle seed oil added FBS/DMEM for 24 hours. Then anti-DNP IgE Ab (1 µg/ml) was further added and co-cultured for 6-12 hours to sensitize the mast cells. After removing the supernatant, DNP-BSA (100 ng/ml) was added and incubated for 1 hour to activate the mast cells. This supernatant was thus collected and stored frozen. An equal volume of supernatant and p-NAG substrate (1 µM) were transferred to a 96-well plate and react at 37° C. for 1 hour to measure the value of 405 nm absorbance (BioTek, Synergy™, USA). The results are discussed as below: Mast cells are one of the main responding cells in the immune system. Activated mast cells would release pro-inflammatory factors, for example, tumor necrosis factor (TNF-α), interleukin (IL) and inflammatory mediators. When mast cells are stimulated by allergens and IgE, these mediators, i.e., TNF-α, MCP-1, IL-4, in the cytoplasm are discharged out of the cells, thus leading to the occurrence of allergic symptoms. The phenomenon is called degranulation. β-hexosaminidase is a granulation enzyme present in mast cells and is an indicator enzyme for mast cell degranulation. Following discussions are the results of the test. After stimulation with allergen, IgE, the mast cells released 57.0% (3-hexosaminidase. After the treatment of 100 µg/mL roselle seed oil, the release of 3-hexosaminidase was 50.4%, meanwhile, 47.1% was presented after 250 µg/mL roselle seed oil was loaded. The data demonstrate that roselle seed oil would reduce the release of (3-hexosaminidase in mast cells by 9.9%.

The roselle seed oil can be a botanical active pharmaceutical ingredient (API) for a composition. The composition is cosmetics, skin care products, fragrances, body cleaning products, health care products, or other products, but with no limitations. A preferred embodiment is that the composition has the roselle seed oil and other ingredients, wherein the ingredients is/are selected from the group consisting of pure water, 1,2-hexanediol, sodium PCA, glycerin, chlorphenesin, allantoin, and fragrance, but with no limitations. In another preferred embodiment, the composition is used to make a spray product, which is convenient to use and can be applied to the face easily and evenly. One more preferred embodiment is described as following. The roselle seed oil was used as an ingredient of a product, and based on the total weight of the product. The ingredient is listed below: pure water for 85% to 97% weight of the total composition of the spray, the roselle seed oil for 1.5% to 5% weight of the total composition of the spray, the 1,2-hexanediol for 0.5% to 2% weight of the total composition of the spray, the natural moisturizing factor for 0.5% to 2% weight of the total composition of the spray, the glycerin for 0.2% to 1.5% weight of the total composition of the spray, the preservative for 0.01% to 0.5% weight of the total composition of the spray, the allantoin for 0.01% to 0.5% weight of the total composition of the spray, and the fragrance for 0.01% to 0.5% weight of the total composition of the spray. In addition, there is another preferred embodiment based on the total weight of the product either, which composition comprises 93.35% weight of the pure water, 2.5% weight of the roselle seed oil, 1% weight of the 1,2-hexanediol, 1% weight of the natural moisturizing factor, 0.8% weight of the moisturizing glycerin, 0.15% weight of the preservative, 0.1% weight of the allantoin, and 0.1% weight of the fragrance.

Figure 10:
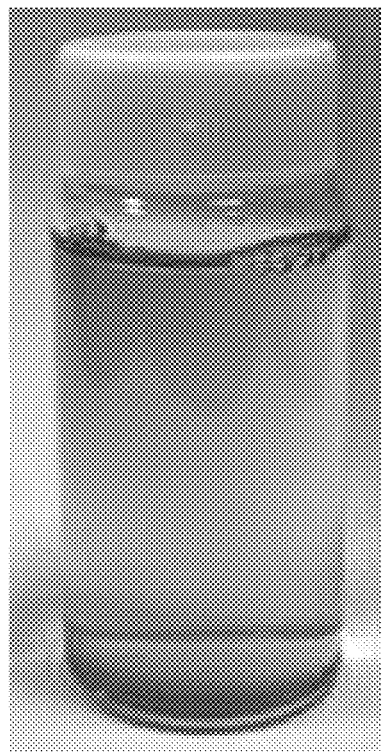
Figure 10:
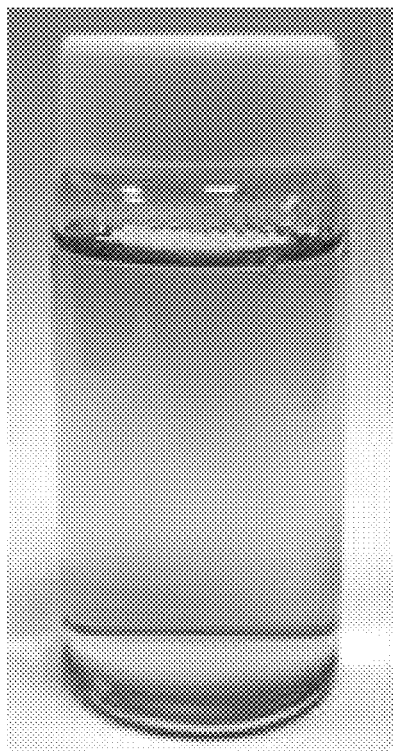

As shown in FIG. 10, which illustrates stability and thermal stability cycling tests on products containing roselle seed oil. In the experiment, 2 mL of the product was dispensed to a sample accommodator, and then put into an oven with a surrounding temperature of 50° C. for 12 hours, continuously moving to a 4° C. refrigerator for 12 hours. Above procedures are defined as one cycle, and the experiment needs 7 cycles. During the experiment time period, the product of the starting day and the other product of the 7th day were picked up for shooting and recording the changes in the external phase, color, pH, viscosity and other properties of the product for thermal stability of the product formulation. According to FIG. 10, after the thermal stability test, the external phase of the product of the roselle seed oil was observed that there was no delamination or obvious change. As shown in Table 3, a color difference measurement is used to measure the color change. Among the changes in color (L value), the L value of the anti-allergy skin care spray product of roselle seed oil was changed by 0.03, and the color L value of the product changed on the 7th day was less than 10. Using the pH meter to measure the pH value change demonstrated that the pH value change of the anti-allergic skin-relieving maintenance spray product of the roselle seed oil was 0.04. The change of the pH value on the seventh day was less than ±1. Measuring the change of conductivity with a conductivity meter is to obtain that the conductivity change. The conductivity change of the anti-allergic skin-relieving maintenance spray product of the roselle seed oil was -1.8, and the conductivity change on the seventh day was less than 50 μS/cm.

TABLE 3

Stability Test of Product Containing Roselle Seed Oil

| | Product Containing Roselle Seed Oil | | |
|---|---|---|---|
| | $1^{st}$ day test | test after cold and heat cycle | change |
| Color (L value) | 19.14 | 19.17 | 0.03 |
| pH value (PH value) | 5.66 | 5.7 | 0.04 |
| Viscosity (CP value) | 4.91 | 3.11 | -1.80 |

Figure 11:
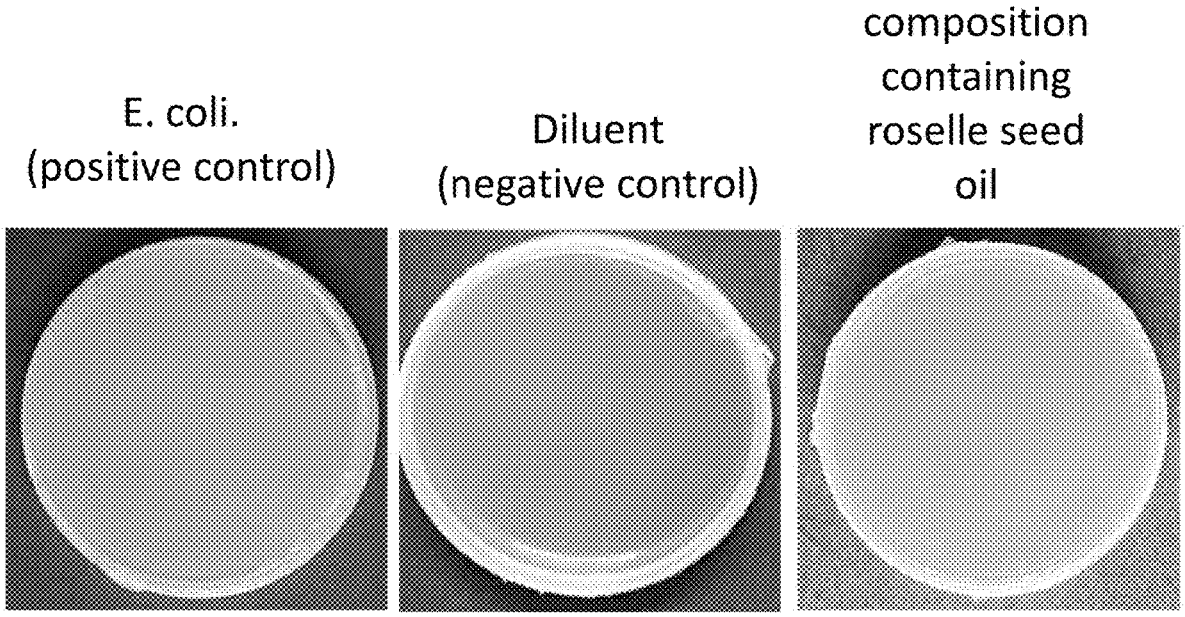

As shown in FIG. 11, which is a test of a total plate count of the anti-allergic skin care spray product with the roselle seed oil. In the test, the steps are of that: weighing 1 mg of the sample and adding it to 1 mL of sterile Tween 80; using a shaker to mix evenly, and then adding 8 mL of TSB medium to mix; then taking 1 mL onto the TSB medium, and distributing the mixture evenly on the surface of the medium; culturing in a 30° C. incubator for 48 hours, and photographing for records. There were two types of controls, a positive control and a negative control. The positive control is E. coli, and the negative control is Tween 80 for dilution and emulsification. The product was mixed with TSB medium, evenly spread on TSB medium, and then placed in a 30° C. incubator for 48 hours, continuously photographed to record the growth of microorganisms. This test is specially for evaluating the preservative efficacy of the product. The result is that no colonies were produced after the product was incubated for 48 hours. Therefore, the product can achieve anti-allergic and skin-calming effects.

More preferably, a clinical trial for proofing the relevant efficacy of the composition containing the roselle seed oil for skin quality improvement was proceeded, wherein the trail comprising the steps of: a subject being evenly sprayed the composition on the face skin after washing the face in the morning, and the dosage of each spray being about 3 to 5 mg/cm$^2$; and comparing the skin difference of the subject using the composition after four weeks. A preferred embodiment is that of a subject washing the face with water before testing; and after 30 minutes at room temperature, the subject accepting the evaluation test of various skin types. Further, the number of the subjects was 20, but without any limit. For designing another embodiment, it is of examining the basic skin type, then observing the change of the skin type after applying the composition for the second or fourth week.

Preferably, the skin efficacy test uses that of: a non-invasive skin color difference analyzer to test skin color improvement, a skin moisture meter to test changes in skin moisture content, or a full-face skin texture tester to test skin redness values, red areas (inflammatory acne and blood vessels). With reference to Table 4, which illustrates test results related to skin quality testing. Compared with the non-using ones, and after using the composition for four weeks, the subjects' skin brightness was increased up to 2.5%, the skin redness value was decreased down to 6.1%, the skin moisture content (moisturizing degree) was increased up to 10.2%, the skin pores was decreased down to 1.6%, 8.1% decreased in skin texture, and 4.9% decreased in skin redness (inflammation). For another preferred embodiment, the model of the skin color difference analyzer was Chroma Meter MM500, Minolta, Japan, and the position to be tested by the analyzer was upper cheek. The standard colorimetric method formulated by the CIE (Commission Internationale deL'Eclariage) system was used to obtain the quantification of the color L* value, wherein the range of L*value is from 0 to 100, which is a gray scale, and the higher the value represents brighter skin, or a quantification of color a* value, wherein the higher a* value represents more red and inflamed skin. For more preferred embodiment, the model of the skin moisture meter was Corneometer CM825, CK, Germany, which was used to detect the skin on the upper cheek. The skin moisture measuring instrument was based on the amperometric method to test the moisturizing ability of the skin. Further that, a whole face skin quality detector was a VISIA micro-analysis skin image analyzer, and the model was VISIA™ Complexion Analysis, U.S.A, wherein the skin position detected by the VISIA micro-analysis skin image analyzer was the whole face. The VISIA micro-analyzed skin image analyzer included a closed face camera room (unified light source), which uses standard white light and 36 million pixels to take pictures, and then analyze and compare the image data. In particular, the VISIA Micro-Analysis Skin Image Analyzer adopts standard white light to detect the shadows generated in the sunken positions of skin pores, so as to evaluate the number and distribution of pores, or the standard white light is to detect skin shading changes for skin smoothness, wherein the raised part of the skin surface is yellow, the recessed part is blue, and the less yellow and blue, the smoother the skin surface. In another preferred embodiment, the VISIA micro-analysis skin image analyzer included a closed face camera room (unified light source), which uses RBX polarized light technology to separate white light into three primary colors of blue, green and red, so that the light source can penetrates deeper into the skin to detect red and brown skin problems for analysis. RBX polarized light technology is able to detect blood vessels or heme in the deep layer of the skin for acne, inflammation and other conditions. In another preferred embodiment, the VISIA micro-analysis skin image analyzer includes a closed face camera room (unified light source), which uses UV light (365 nm) for detection, and 36 million pixels to take pictures and analyze them.

TABLE 4

Human Skin Efficacy Test Results before and after sing the Present Invention

|  | Not using the composition | Using for two weeks | Using for four weeks |
|---|---|---|---|
| Skin tone (%) | 100.0 ± 1.5 | 101.5 ± 1.3 | 102.5 ± 1.3 |
| Skin erythema index (%) | 100.0 ± 3.7 | 99.3 ± 3.8 | 93.9 ± 4.3 |
| Skin moisturizing (%) | 100.0 ± 3.3 | 103.2 ± 3.5 | 110.2 ± 3.1 |
| Skin pores (%) | 100.0 ± 9.9 | 98.9 ± 10.0 | 98.4 ± 9.1 |
| Skin texture (%) | 100.0 ± 16.7 | 98.1 ± 14.7 | 91.9 ± 15.3 |
| Inflamed skin (%) | 100.0 ± 10.4 | 101.2 ± 10.0 | 95.1 ± 11.2 |

Figure 12:
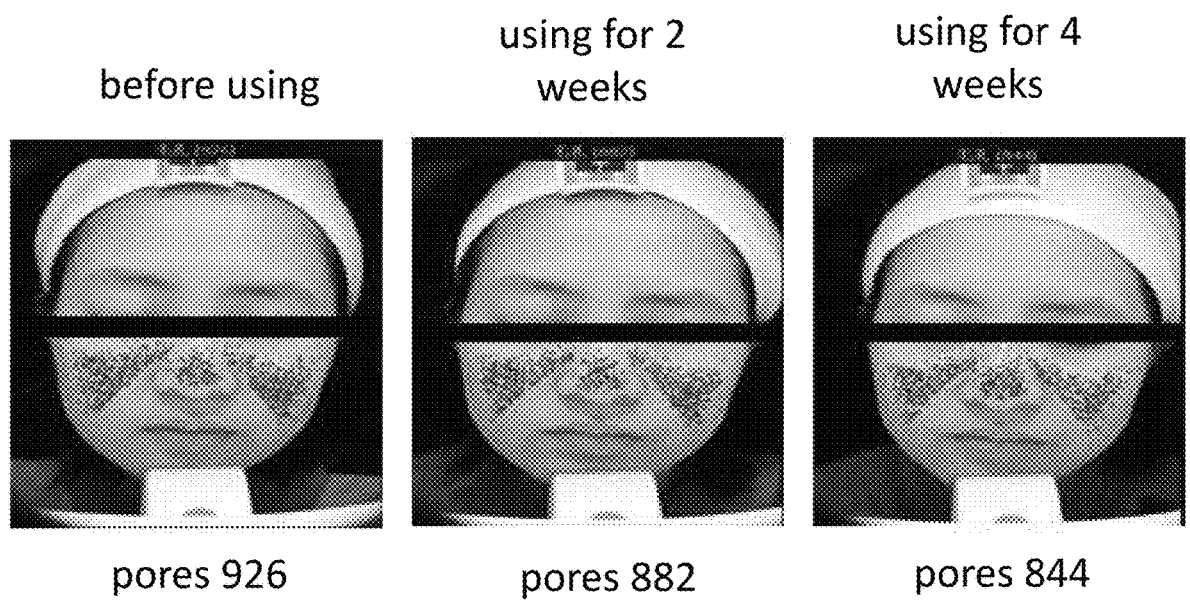
Figure 13:
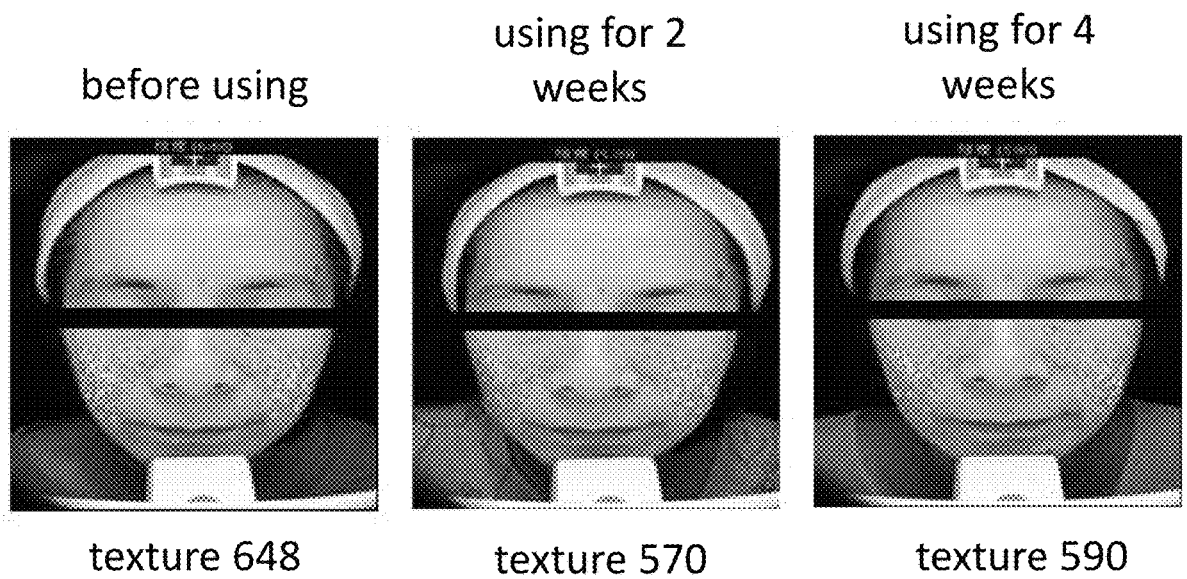
Figure 14:
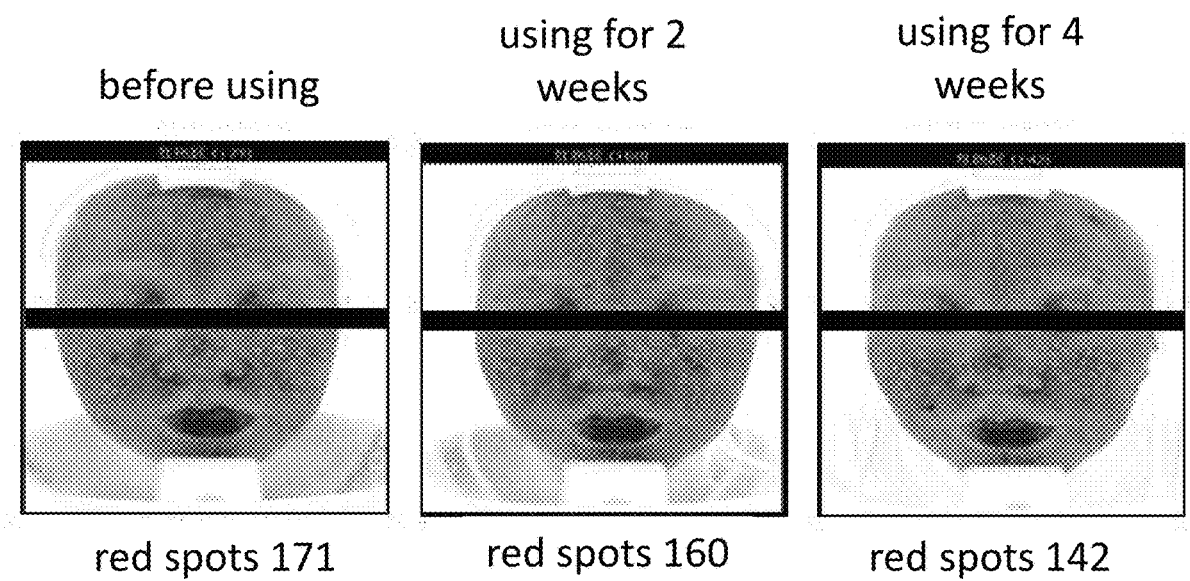

From FIG. 12 to FIG. 14, which illustrate skin improvement after using the composition for four weeks. The results are listed in Table 5. It demonstrates that after applying the composition containing the roselle seed extract to human skin, the skin tone was increased, the skin moisturization was increased, the skin erythema index was reduced, the skin pores are reduced, the skin texture was reduced, the skin red areas (inflamed parts) were reduced.

TABLE 5

Improvement of Various Skin Conditions after using the Composition

|  | Skin texture improvement after using the composition for four weeks |
|---|---|
| Skin tone (brightness) | Increased 2.5% |
| Skin erythema index (erythema index) | Decreased 6.1% |
| Skin moisturizing (moisture) | Increased 10.2% |
| Skin pores (pores) | Decreased 1.6% |
| Skin texture (texture) | Decreased 8.1% |
| Inflamed skin (red spots) | Decreased 4.9% |

Compared with prior arts, there is nothing found for extracting roselle seed oil. The present invention extracts roselle seeds to obtain the extracts that are beneficial to the skin of human being, and of the extracts are manufactured to spray products, so as to let users evenly spray or coat the products on the skin of human being, and thus the human skin can averagely absorb the active ingredients contained in the roselle seed extract. As a matter of fact, As a matter of fact, skin disorders like itching, redness and roughness would easily happen after a long-term mask wearing in daily life. External environment, high temperature, ultraviolet radiation, or air pollution will also cause significantly increases of skin sensitive problems. Therefore, those factors which accelerate the deterioration of skin diseases, skin aging, or the formation of pigment spots would led to the occurrences of skin sensitivity. The active ingredients contained in the roselle seed extract provided by the present invention can help human skin for anti-oxidation, anti-inflammation, anti-UVB, anti-allergy, whitening, moisturizing, and anti-wrinkle, so it can be used as raw materials as well as the botanical active pharmaceutical ingredients (API) for medicines, skin care, cosmetics, fragrances, body cleaning, etc. In addition, the roselle seed extract is harmless to the human body and can be used without any concern.

Although the invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A method for providing antioxidant, anti-inflammation, anti-UVB, anti-allergy, whitening, moisturizing, and anti-wrinkle effects to a subject, comprising applying a composition containing extracts of the roselle seeds to a skin of the subject, wherein the extracts of the roselle seeds comprise lauric, palmitic, linoleic, oleic, and stearic acids; and the extracts of the roselle seeds are prepared using a preparation method comprising steps of:

steeping of: extracting a weight ratio of the 12:1 to 20:1 roselle seeds and an ethanol solution with a concentration of 75 to 95%; and steeping the roselle seeds in the ethanol solution to obtain a suspension; and extraction of: the suspension being engaged in an extraction of a continuous and rapid oscillation with an ultrasonic energy with a total energy of 200 to 500 W, wherein 1 to 3 hours of the oscillation is one cycle, and a total number of 3 to 5 cycles is lasted, in order to obtain roselle seed crude extracts.

2. The method according to claim 1, wherein the preparation method further comprises a step of: filtering and concentration being that of removing a solvent of the roselle seed crude extracts in order to obtain the roselle seed extract, wherein the roselle seed extract is roselle seed oil.

3. The method according to claim 1, wherein the preparation method further comprises a step of: cleaning being that of purifying the roselle seeds with water, before the step of steeping.

4. The method according to claim 1, wherein the preparation method further comprises a step of: shredding being that of shredding the roselle seeds or griding the roselle seeds to particles until a diameter of a particle being not greater than 1 mm, before the step of steeping.

5. The method according to claim 1, wherein the composition is applied to a skin of a human being so as to improve skin tone, reduce skin erythema index, improve skin moisturization, tighten skin pores, reduce skin texture, and reduce skin inflammation.

6. The method according to claim 1, wherein a dosage of the composition is 1 to 10 mg per square centimeter of the skin.

7. The method according to claim 1, wherein the extracts of the roselle seeds comprise a relative ratio of 8% to 10% of lauric acid, 44% to 52% of palmitic acid, 16% to 24% of linoleic acid, 15% to 23% of oleic acid, and 1% to 4% of stearic acid.

8. The method according to claim 3, wherein the step of cleaning is to purify the roselle seeds for 5 to 15 minutes as one cycle and repeat for 2 to 6 cycles.

9. The method according to claim 3, wherein the method for preparing the extracts of the roselle seeds further comprises a step of: drying comprising that of disposing the roselle seeds on an absorbent material for drying 12 to 72 hours, after the step of cleaning.

10. The method according to claim 2, wherein a production rate of the roselle seed oil is between 4% and 10%.

* * * * *